United States Patent [19]

Izumiya et al.

[11] Patent Number: 5,637,240
[45] Date of Patent: Jun. 10, 1997

[54] ELECTRICAL DISCHARGE MACHINING METHOD AND ELECTRICAL DISCHARGE MACHINING APPARATUS

[75] Inventors: Shunzo Izumiya, Fujiyoshida; Akiyoshi Kawahara, Oshino-mura, both of Japan

[73] Assignee: Fanuc Ltd., Yamanashi, Japan

[21] Appl. No.: 211,153

[22] PCT Filed: Jul. 19, 1993

[86] PCT No.: PCT/JP93/01006

§ 371 Date: Mar. 22, 1994

§ 102(e) Date: Mar. 22, 1994

[87] PCT Pub. No.: WO94/03299

PCT Pub. Date: Feb. 17, 1994

[30] Foreign Application Priority Data

Jul. 31, 1992 [JP] Japan ..................... 4-225012
Sep. 29, 1992 [JP] Japan ..................... 4-282161

[51] Int. Cl.⁶ ..................... B23H 1/02; B23H 7/20
[52] U.S. Cl. ..................... 219/69.17; 219/69.13; 364/474.04
[58] Field of Search ..................... 219/69.13, 69.18, 219/69.12, 69.17; 364/474.04

[56] References Cited

U.S. PATENT DOCUMENTS

| | | | |
|---|---|---|---|
| 4,559,434 | 12/1985 | Kinoshita | 219/69.17 |
| 4,970,363 | 11/1990 | Obara | 219/69.12 |
| 5,200,905 | 4/1993 | Uemoto et al. | |
| 5,267,141 | 11/1993 | Morita et al. | 219/69.13 |
| 5,408,064 | 4/1995 | Takahara | 219/69.13 |
| 5,453,592 | 9/1995 | Takeuchi et al. | 219/69.17 |

FOREIGN PATENT DOCUMENTS

| | | | |
|---|---|---|---|
| 4025294 | 2/1991 | Germany. | |
| 61-30334 | 2/1986 | Japan | 219/69.13 |
| 62-84919 | 4/1987 | Japan | 219/69.13 |
| 63-12727 | 3/1988 | Japan. | |
| 63-318210 | 12/1988 | Japan. | |
| 1-135421 | 5/1989 | Japan. | |
| 1-281821 | 11/1989 | Japan. | |
| 4-19017 | 1/1992 | Japan | 219/69.13 |
| 4-348818 | 12/1992 | Japan | 219/69.13 |

*Primary Examiner*—Geoffrey S. Evans
*Attorney, Agent, or Firm*—Staas & Halsey

[57] ABSTRACT

An electrical discharge machining method for automatically updating machining conditions so that the discharge state agrees with a target value and an electrical discharge machining apparatus for carrying out the method. Initial machining conditions, a target discharge state (e.g., normal discharge rate) and a constant for computing new machining conditions are set. A register for storing actual machining conditions is loaded with the initial machining conditions, and machining operation is started under these machining conditions. The deviation between detected data indicative of the discharge state and the target discharge state is obtained. The new machining conditions are obtained by adding the product of the deviation and the constant to the current machining conditions. These processings are repeated in succession, and the machining conditions are updated so that the discharge state agrees with the target discharge state. The target discharge state is obtained by test machining.

8 Claims, 3 Drawing Sheets

ELECTRICAL DISCHARGE MACHINING METHOD AND ELECTRICAL DISCHARGE MACHINING APPARATUS

TECHNICAL FIELD

The present invention relates to an electrical discharge machining method for automatically changing machining conditions during machining operation and an electrical discharge machining apparatus for carrying out the method.

BACKGROUND ART

In a conventional electrical discharge machining apparatus, machining is generally performed in accordance with previously set machining conditions. In other words, machining is generally executed under initially set machining conditions without changing machining conditions, including voltage applied between an electrode and a workpiece, servo voltage which determines the electrode feeding speed, capacitance in the case where the apparatus uses a capacitor discharge power source, on/off-time for the voltage applied between the electrodes, etc., during the machining operation.

A method in which machining conditions are changed depending on a discharge state between electrodes during machining operation is disclosed in Japanese Patent Publication No. 63-17568, for example. In the machining method described in this document, the machining conditions are changed in a manner such that a storage device is provided beforehand with a data table stored with data of several kinds, the data stored in the storage device are selected on the basis of detected data from a detecting device for detecting the discharge state, and new machining conditions are determined by executing an arithmetic operation for the selected data.

According to the method described above, the data are selected from the data table of the storage device in accordance with the detected data, and the machining conditions are changed depending on the selected data, so that the change of the machining conditions are restricted by the contents of the data table. Since the machining conditions can be changed only by stages, the controllability is not satisfactory. If the data stored in the table are increased in quantity so that the machining conditions can be changed to reflect fine differences between the detected data, this will cause not only a problem that the storage capacity of the storage device is depressed but also a problem such as the drop of the processing speed.

DISCLOSURE OF THE INVENTION

The present invention provides an electrical discharge machining method and apparatus in which machining conditions are automatically updated so that detected data indicative of a discharge state agrees with a target value during machining operation.

An electrical discharge machining method according to the present invention comprises the steps of: storing storage means with initial machining conditions for controlling a discharge state between a machining electrode and a workpiece, a target value of detected data indicative of the discharge state, and a constant for deriving new machining conditions, detecting the discharge state between the machining electrode and the workpiece and outputting the detection data indicative of the discharge state, computing the deviation between the detected data and the target value, executing a predetermined arithmetic operation based on the constant and the deviation and successively updating said initial machining conditions to obtain the new machining conditions, and controlling the discharge state in accordance with the obtained new machining conditions. Further, the present invention provides the means for carrying out these individual steps.

According to the arrangement described above, the machining conditions are automatically updated so that the detected data indicative of the discharge state agrees with the target value during the electrical discharge machining operation, whereby an optimum discharge state is obtained.

In the case of a wire-cut electrical discharge machining apparatus, in particular, the discharge state varies depending on the workpiece material, workpiece shape, wire diameter, nozzle, gap in a machining fluid supply nozzle etc., so that the target value of the detected data for optimum machining also varies depending on the workpiece material, workpiece shape, wire diameter, nozzle gap, etc. Thus, before starting a regular machining operation, a test machining operation is performed and detected data (average value) from a detecting device is set as the target value when an optimum test machining is performed.

BEST MODE FOR CARRYING OUT THE INVENTION

Figure 1:
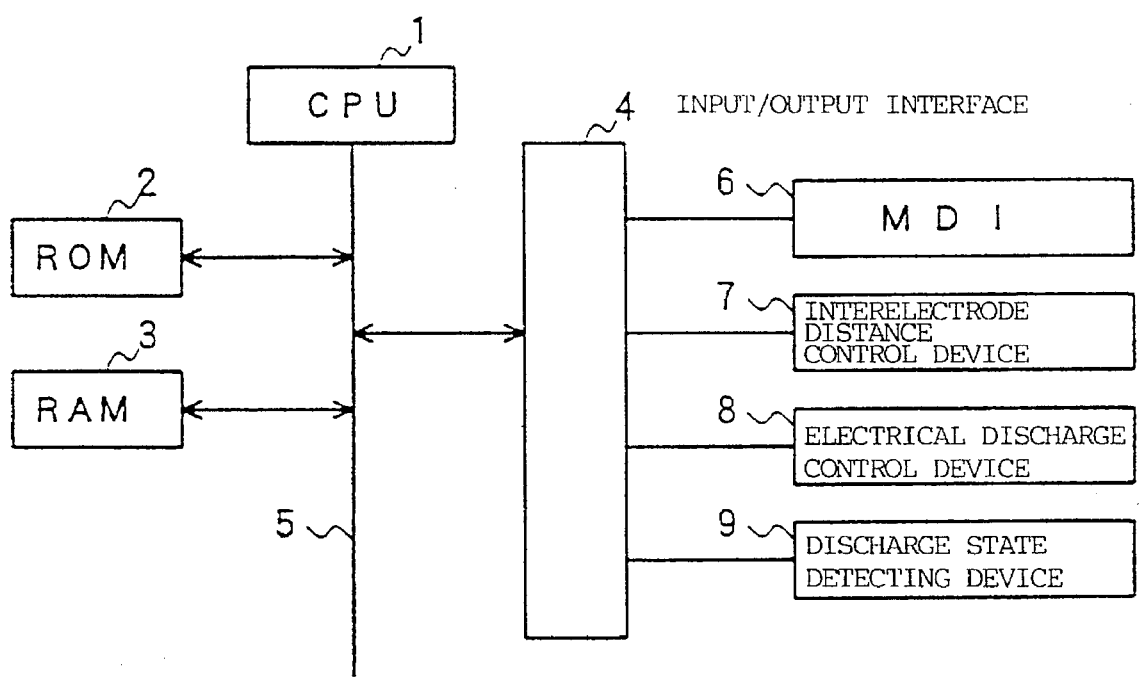
FIG. 1 is a block diagram of an electrical discharge machining apparatus according to an embodiment of the present invention.

In FIG. 1, numeral 1 denotes a central processing unit (CPU); 2, a ROM for storing control programs; 3, a RAM for storing machining programs and various set values of machining conditions and temporarily storing data during various arithmetic operations; and 4, an input/output interface. The CPU 1, ROM 2, RAM 3, and input/output interface 4 are connected by means of a bus 5. The input/output interface 4 is connected with a manual data input device 6 for inputting various data, such as the machining conditions, with an interelectrode distance control device 7 for controlling the distance between two electrodes, a wire electrode and a workpiece, with an electrical discharge control device 8 for controlling the discharge state, and with a discharge state detecting device 9 for detecting the discharge state. 20 The interelectrode distance control device 7, electrical discharge control device 8, and discharge state detecting device 9 are known devices, and a detailed description of those devices is omitted.

The CPU 1 delivers machining commands including the machining conditions to the interelectrode distance control device 7 and the electrical discharge control device 8 through the input/output interface 4 in accordance with the control programs stored in the ROM 2 and on the basis of the machining programs stored in the RAM 3. On receiving the machining commands, the interelectrode distance control device 7 drives a servomotor, which moves the electrodes relatively at a constant speed set as a machining condition, for example. In the case of a servo feed control system, the servomotor is driven, so that an average machining voltage between the electrodes detected by a discharge state detecting device 9 is equivalent to a reference voltage. The electrical discharge control device 8 outputs machining pulses between the machining electrode and the workpiece. A repetition period T of the discharge of the machining pulses consists of a machining pulse width (discharge time) τ on and a discharge quiescent time τ off (off-time) for the recovery of insulation. Although this electrical discharge machining apparatus operates in the same manner as the conventional electrical discharge machining apparatus, the machining conditions are successively updated, depending on the discharge state, during the electrical discharge machining, according to the present invention.

Figure 2:
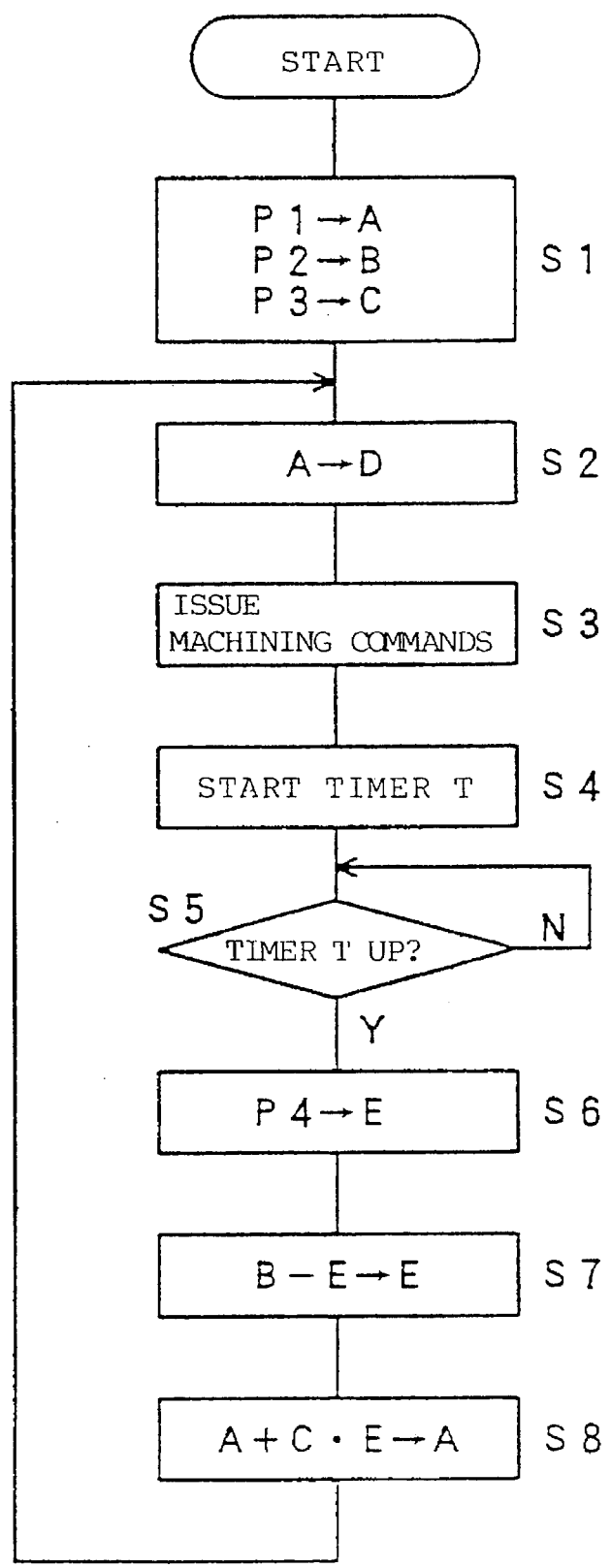
FIG. 2 is a flow chart of a machining condition changing process according to the present invention.

Referring now to the flow chart of FIG. 2, a machining condition changing process based on a method according to the present invention will be described.

In the present embodiment, the discharge state detecting device 9 detects the normal discharge rate (ratio (%) of normal discharge frequency to total discharge frequency in a given time), which is the detected data indicative of the interelectrode discharge state, and the off-time τ off as one of machining condition is automatically updated so that the normal discharge rate is equal to its target value.

First, initial machining conditions including the value of the off-time τ off, the target value of the detected data indicative of the discharge state, and a constant for the computation of new machining conditions are inputted by the manual data input device 6, and are stored in the RAM 3. In the present embodiment, the value of the off-time τ off, as one of the initial machining conditions, the target value of the normal discharge state and the constant for the computation of new machining conditions are represented by P1, P2 and P3, respectively. Moreover, in the following description, these set values P1 to P3 are given as P1=100 (μs), P2=50 (%), and P3=1.

First, in Step S1, the CPU 1 loads registers A, B and C with the off-time value P1 (=100 μs) stored and set in the RAM 3, the target value P2 (=50%) of the detected data representing discharge state, and the constant P3 (=1), respectively. Then, in Step S2, the CPU 1 stores a storage device D with the off-time value P1 (=100 μs) which is stored in the register A, together with other set machining conditions. The machining conditions are read out from the storage device D and used for the interelectrode distance control device 7 and the electrical discharge control device 8. In Step S3, the CPU 1 delivers the machining commands to the electrical discharge control device 8, thereby starting the electrical discharge machining.

On receiving the machining commands, the electrical discharge control device 8 starts the electrical discharge machining in accordance with the machining conditions stored in the storage device D. Thus, the electrical discharge machining is started with the off-time τ off of the value P1 (=100 μs) previously set in the register A.

Subsequently, the CPU 1 resets and starts a timer T in Step S4, and waits for the timer T to measure a predetermined set time in Step S5. When the predetermined time is measured by the timer T, the CPU 1 proceeds to Step S6, whereupon it fetches to a register E the detected data P4 detected by the discharge state detecting device 9. In the present embodiment, the normal discharge rate detected by the discharge state detecting device 9 is fetched as the detected data P4. If the recovery of insulation between the electrodes is imperfect during the electrical discharge machining operation, electrical discharges with incomplete insulation increase, so that the normal discharge Pate lowers. In this example, the value of detected data P4 is 40%.

Subsequently, in Step S7, the deviation is computed by subtracting the value stored in the register E from the target value P2 (=50%) for the detected data stored in the register B (P2−P4=50%−40%=10%), and this deviation is loaded into the register E (E=10%). Then, in Step S8, the value in the register E is multiplied by the constant P3 (=1) stored in the register C; the product is added to the value in the register A; and the resulting value is loaded into the register A. In this example, the value (A+C·E) stored in the register A in Step S8 is 100+1×10=110. Thereafter, the program returns to Step S2, whereupon the processing of Step S2 and the subsequent processings are executed using the machining condition (off-time: 110 μs) computed in Step S8 as a new machining condition. In the above example, the off-time increases from 100 μs to 110 μs. Accordingly, the discharge quiescent time in the discharge repetition period T is extended, and the recovery of insulation between the electrodes is expedited, thereby increasing the normal discharge rate.

Hereafter, the processings of Steps S2 to S8 are repeated during the electrical discharge machining operation, and the machining is executed with the off-time as a machining condition being varied in succession so that the detected data (normal discharge rate) P4 indicative of the electrical discharge machining state coincides with the target value P2. In this manner, the value of the off-time is optimally controlled so that the normal discharge rate is equal to the target normal discharge rate.

In the embodiment described above, the target value of the discharge state detection data is set to a certain value for optimum machining. In the case of a wire-cut electrical discharge machining apparatus, in particular, however, the discharge state varies depending on the workpiece material, workpiece shape, wire diameter, nozzle gap, etc., so that the target value of the detected data, indicative of the discharge state, also varies. For example, the aforesaid normal discharge rate also varies depending on the conditions, including the workpiece material, workpiece shape, wire diameter, nozzle gap, etc., and is not fixed.

Figure 3:
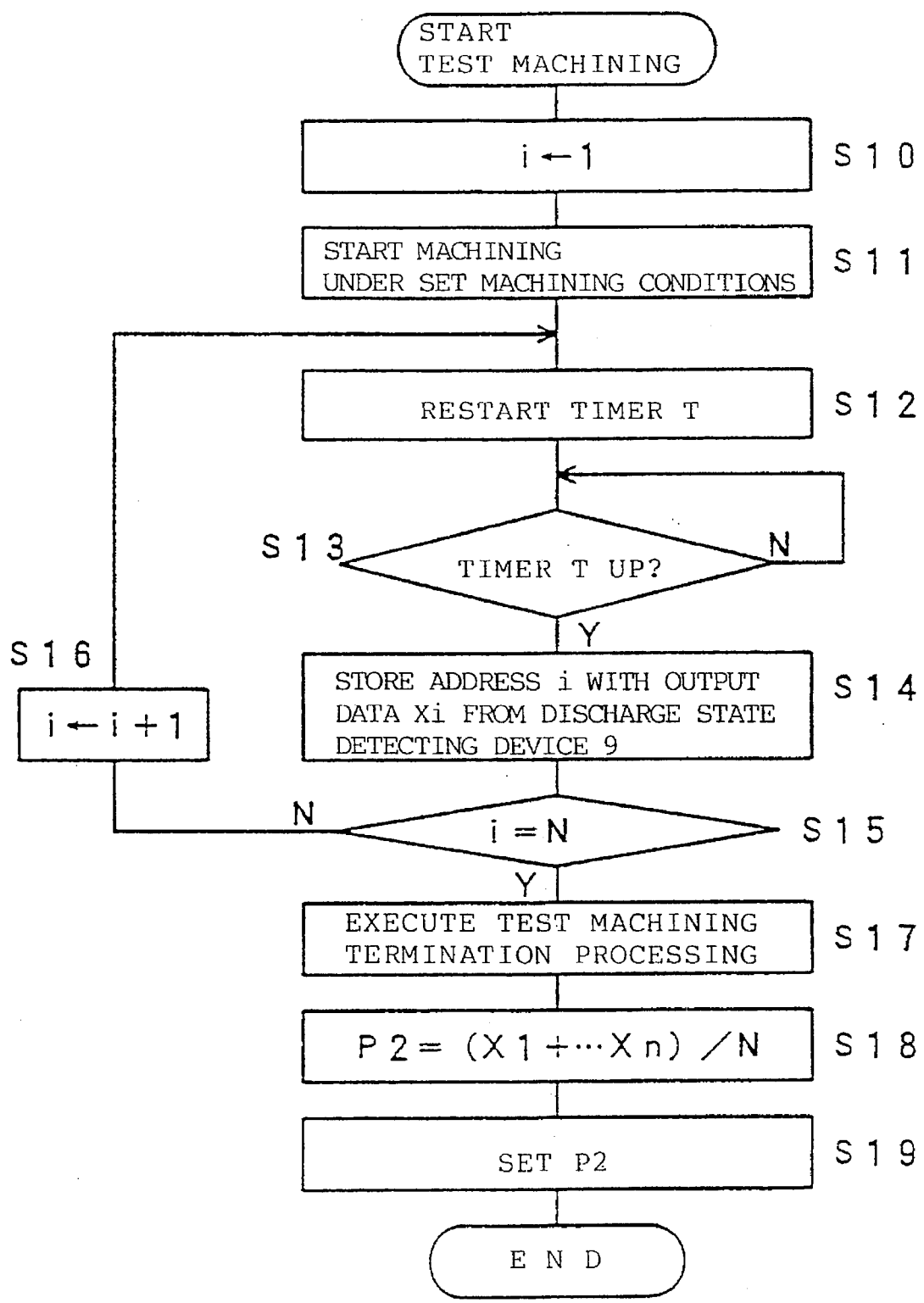
FIG. 3 is a flow chart of the process for obtaining a target value of a discharge state in a case of test machining.

Accordingly, the aforesaid target value is set after conducting prior test machining using the workpiece and the wire electrode to be used in actual machining. First, machining conditions for the optimum machining are settled, and are set and stored in the RAM 3. Then, when test machining commands are inputted by means of the manual data input device 6 in order to obtain the target value (normal discharge rate), the CPU 1 executes a test program (linear machining) stored in the ROM 2 and shown in the flow chart of FIG. 3.

After an index i is first set to "1" in Step S10, the program proceeds to Step S11, whereupon machining is started under the machining conditions settled in the aforesaid manner. At the same time, the CPU 1 resets and starts the timer T in Step S12, and waits for the timer T to measure the predetermined set time in Step S13. When the predetermined time is measured by the timer T, detected data Xi outputted from the discharge state detecting device 9 is read and stored in an address i of the RAM 3 in Step S14. Then, in Step S15, it is determined whether or not a set value N is reached by the index i. If N is not reached by the index i, the program proceeds to Step S16, whereupon the index i is incremented, and the processings of Steps S12 to S15 are repeated. If N is reached by the index i and N number of detected data are obtained, the program proceeds to Step S17, whereupon the electrical discharge machining operation is stopped, and a test machining termination processing is started. The average of detected data X1 to Xn is obtained by dividing the sum of the detected data by N in Step S18, the average value is set as the target value P2 in a predetermined address in the RAM 3 in Step S19, and the test machining terminates.

In this manner, the target value of the detected data indicative of the discharge state is set on the basis of the test machining. If actual machining is carried out after the test machining is finished, a machining condition (off-time of discharge in this example) is automatically updated by the processing shown in FIG. 2, and the detected data outputted from the discharge state detecting device 9 is controlled so as to be coincide with the target value.

In the above embodiment, the off-time is given as the machining condition to be automatically updated; however, it may be replaced with any other machining conditions. For example, it may be replaced with any of other machining conditions such as the duty ratio which depends on the on-time and on/off-time, voltage applied between the electrodes, capacitance of the capacitor, etc.

In the embodiment described above, the processor is provided only for executing the machining condition changing process. In case where the processor is designed to execute other processings, it is necessary only that the machining condition changing process is required to be executed with every predetermined period. In this case, Steps S4 and S5 may be omitted, and the processings of Steps S2 and S3 may be set to be executed after the processings of Steps S8 to S8 are carried out for each period.

According to the present invention, the machining condition is automatically updated and feedback-controlled so that the detected discharge state coincides with the target discharge state, whereby the machining can always be executed under optimum machining conditions. Thus, the discharge state attains the fixed target discharge state, thereby increasing the stability of the electrical discharge. In the case of the wire-cut electrical discharge machining apparatus in which the target discharge state varies depending on the workpiece material, wire electrode diameter, etc., the aforementioned target value is previously obtained by the test machining, so that optimum electrical discharge machining control can be enjoyed at all times.

We claim:

1. An electrical discharge machining method for machining a workpiece by applying voltage between a machining electrode and the workpiece to cause electrical discharge therebetween, said method comprising the steps of:

(a) storing storage means with initial machining conditions for controlling a discharge state between the machining electrode and the workpiece, with a target value of detected data indicative of the discharge state, and with a constant for deriving new machining conditions;

(b) detecting the discharge state between the machining electrode and the workpiece and outputting the detected data indicative of the discharge state;

(c) deriving a deviation between the detected data outputted in said step (b) and the target value stored in said step (a);

(d) executing a predetermined arithmetic operation based on the constant stored in said step (a) and the deviation derived in said step (c), and successively updating said initial machining conditions to obtain new machining conditions; and (e) controlling the discharge state in accordance with the new machining conditions obtained in said step (d).

2. An electrical discharge machining method according to claim 1, wherein said arithmetic operation in said step (d) includes obtaining an amount correlative with said deviation by using said constant, and determining the new machining conditions by changing the machining conditions for said amount.

3. An electrical discharge machining method according to claim 2, wherein said new machining conditions are given as A+C·E, where A, C and E represent said machining conditions, said constant and said deviation, respectively.

4. An electrical discharge machining method for machining a workpiece by applying voltage between a machining electrode and the workpiece to cause electrical discharge therebetween, said method comprising the steps of:

(a) determining initial machining conditions for controlling a discharge state between the machining electrode and the workpiece;

(b) detecting the discharge state during a test machining operation performed under the initial machining conditions determined in said step (a) and outputting the detected data indicative of the discharge state;

(c) setting the detected data outputted in said step (b) as a target value of the detected data indicative of the discharge state;

(d) detecting the discharge state between the machining electrode and the workpiece during an actual machining operation and outputting detected data indicative of the discharge state;

(e) obtaining the deviation between the detected data outputted in said step (d) and the target value set in said step (c);

(f) successively updating at least one of said initial machining conditions based on the deviation obtained in said step (e) so that the detected data outputted in said step (d) is controlled to coincide with said target value; and (g) controlling the discharge state in accordance with the new machining conditions obtained in said step (f).

5. An electrical discharge machining method according to claim 4, wherein said step (c) includes the step of obtaining the average of a plurality of detected data outputted in said step (b) and setting said average as the target value.

6. An electrical discharge machining apparatus for machining a workpiece by applying voltage between a machining electrode and the workpiece to cause electrical discharge therebetween, said apparatus comprising:

storage means for storing initial machining conditions for controlling a discharge state between the machining electrode and the workpiece, a target value of detected data indicative of the discharge state, and a constant for deriving new machining conditions;

detecting means for detecting the discharge state between the machining electrode and the workpiece and outputting the detected data indicative of the discharge state;

arithmetic processing means for deriving the deviation between the detected data outputted from said detecting means and the target value stored in said storage means, executing a predetermined arithmetic operation based on the constant stored in said storage means and said deviation and obtaining the new machining conditions by successively updating said initial machining conditions; and control means for controlling the discharge state in accordance with the new machining conditions obtained by said arithmetic processing means.

7. An electrical discharge machining apparatus according to claim 6, wherein said arithmetic processing means obtains an amount correlative with said deviation using said constant, and determines the new machining conditions by changing the machining conditions for said amount.

8. An electrical discharge machining apparatus according to claim 7, wherein said new machining conditions are given as A+C·E, where A, C and E represent said machining conditions, said constant and said deviation, respectively.

* * * * *